UNITED STATES PATENT OFFICE.

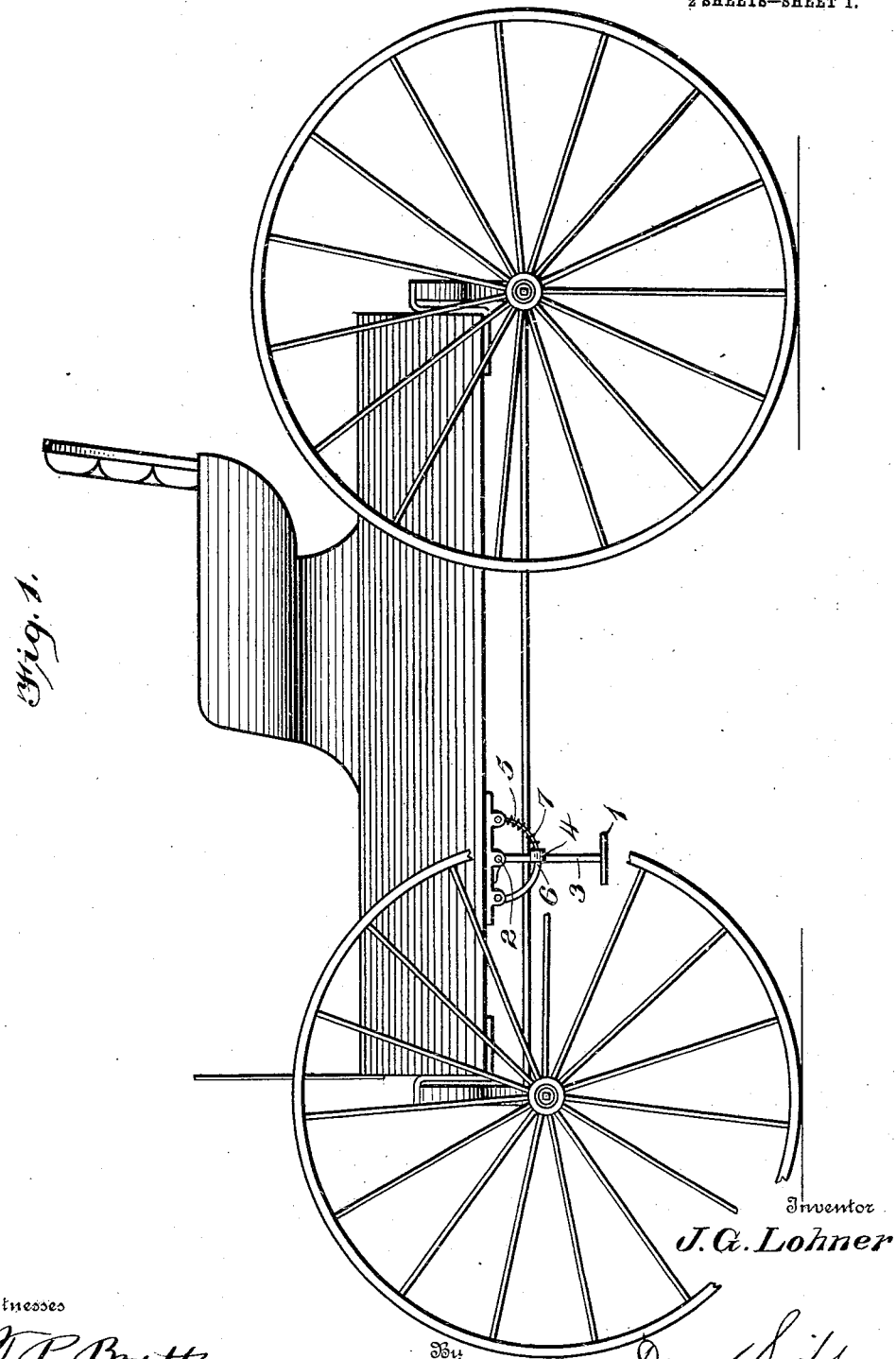

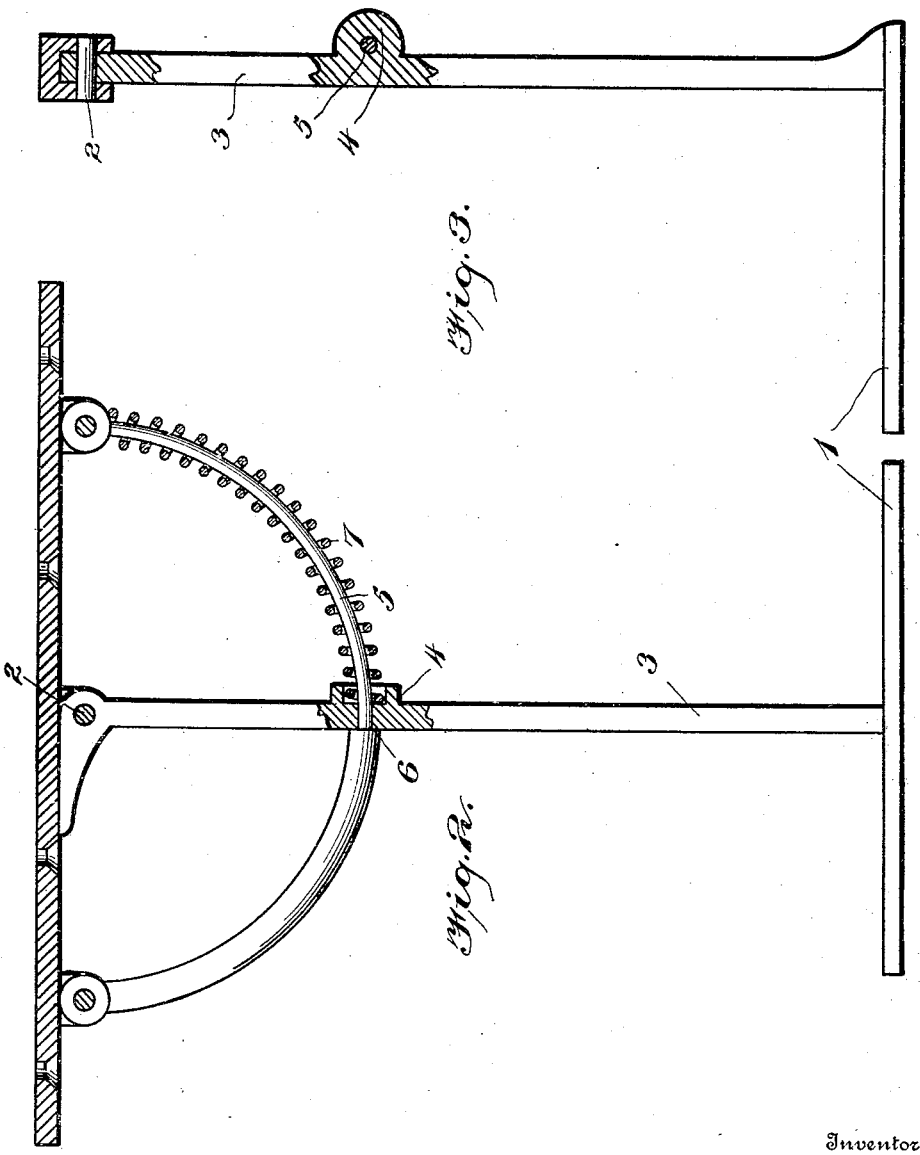

JOHN G. LOHNER, OF SPARKS, OKLAHOMA.

VEHICLE-STEP.

No. 875,540.

Specification of Letters Patent.

Patented Dec. 31, 1907.

Application filed March 27, 1907. Serial No. 364,768.

*To all whom it may concern:*

Be it known that I, JOHN G. LOHNER, a citizen of the United States, residing at Sparks, in the county of Lincoln and Territory of Oklahoma, have invented a new and useful Vehicle-Step; and I do hereby declare the following to be a full, clear, and exact description of the invention, such as will enable others skilled in the art to which it appertains to make and use the same.

The invention relates to improvements in steps for vehicles and has for its object to provide a step adapted to yield when the same comes in contact with a stump or other obstruction, over which the vehicle may be driven.

With these and other objects in view, the invention consists in the novel construction and arrangement of parts hereinafter described and shown and particularly pointed out in the appended claims.

In the drawing forming a part of this specification, and in which like numerals of reference designate corresponding parts, Figure 1 is a side elevation of a vehicle having my improved step applied thereto, Fig. 2 is a longitudinal sectional view through the guide and spring. Fig. 3 is a vertical sectional view taken through the step.

Referring to the drawings, 1 designates a step of suitable construction shown pivoted to the body of a vehicle as at 2. The arm or shank 3 of the step, is provided with an apertured enlargement 4 in which a curved guide 5 is inserted and which holds said step in its proper place. The guide 5 is provided with a shoulder 6 which holds the pivoted step against movement in one direction. The step is held against said shoulder by means of a coil spring 7, as will be readily understood.

In practice, when a vehicle having this improved step comes in contact with a strong obstacle, instead of the step snapping off, the same will yield and afterwards be restored to its normal position by the coil spring.

What is claimed is:

1. A device of the class described, comprising a step pivoted to the body of a vehicle, said step having an inward projection with a perforation therein, a semi-circular guide and brace rigidly connected to said vehicle and passing through said perforation, said guide having means for holding said step against movement in one direction, and means for yieldably holding said step against movement in the opposite direction.

2. A vehicle having a pivoted step, with an aperture therein, a semi-circular guide and brace rigidly connected with the body of said vehicle, said brace having a reduced portion engaging said aperture for guiding and bracing said step in its movement, and a spring mounted on said reduced portion, substantially as described.

In testimony whereof I have signed my name to this specification in the presence of two subscribing witnesses.

JOHN G. LOHNER.

Witnesses:
  W. S. OVERSTREET,
  H. W. PICKETT.